United States Patent
Krohn et al.

[11] Patent Number: 5,947,091
[45] Date of Patent: Sep. 7, 1999

[54] FUEL INJECTION DEVICE FOR AN INTERNAL COMBUSTION ENGINE

[75] Inventors: Klaus-Henning Krohn, Bamberg; Ulrich Vieweg, Nürnberg; Christof Vogel, Bischberg, all of Germany; Edwin Liebemann, Anderson, S.C.; Mathias Thomas, Lauter-Appendorf, Germany

[73] Assignee: Robert Bosch GmbH, Stuttgart, Germany

[21] Appl. No.: 08/860,916

[22] PCT Filed: Aug. 14, 1996

[86] PCT No.: PCT/DE96/01512

§ 371 Date: Nov. 3, 1997

§ 102(e) Date: Nov. 3, 1997

[87] PCT Pub. No.: WO97/18390

PCT Pub. Date: May 22, 1997

[30] Foreign Application Priority Data

Nov. 14, 1995 [DE] Germany ............ 195 423 17

[51] Int. Cl.⁶ ...................................... F02G 5/00
[52] U.S. Cl. ............... 123/549; 123/557; 123/585
[58] Field of Search ................... 123/549, 557, 123/545, 585

[56] References Cited

U.S. PATENT DOCUMENTS

| | | | |
|---|---|---|---|
| 3,999,525 | 12/1976 | Stumpp et al. | 123/549 |
| 4,137,872 | 2/1979 | Loflin | 123/549 |
| 4,545,354 | 10/1985 | Jäggle et al. | 123/585 |
| 4,627,405 | 12/1986 | Imhof et al. | 123/549 |
| 5,355,858 | 10/1994 | Kiyomusa et al. | 123/585 |
| 5,694,906 | 12/1997 | Lange et al. | 123/549 |

FOREIGN PATENT DOCUMENTS

| | | | |
|---|---|---|---|
| 2174504 | 10/1973 | France . | |
| 20 57 972 | 6/1972 | Germany . | |
| 2263501 | 7/1993 | United Kingdom | 123/549 |
| 2 281 101 | 2/1995 | United Kingdom . | |

*Primary Examiner*—Noah P. Kamen
*Attorney, Agent, or Firm*—Kenyon & Kenyon

[57] ABSTRACT

A fuel injection valve for an internal combustion engine includes a metering injection valve and a fuel vaporizer that is arranged upstream from an outlet spray orifice of the injection valve (10) on the intake end and has a vaporizer area with at least one assigned electric heating element. To assure in particular that the fuel vaporizer guarantees very good fuel processing in all heating states, i.e., in heating operation for complete or partial vaporization and in the unheated state, the vaporizer area that accommodates at least one heating element is closed at the outlet end by an outlet valve.

13 Claims, 2 Drawing Sheets

FUEL INJECTION DEVICE FOR AN INTERNAL COMBUSTION ENGINE

FIELD OF THE INVENTION

The present invention relates to a fuel injection device for an internal combustion engine.

BACKGROUND INFORMATION

With a conventional fuel injection device (described in British Patent Application No. 2 281 101), a fuel vaporizer has a vaporizer chamber into which fuel is injected by an injection valve through an inlet orifice. When an ordinary glow plug that is arranged in the vaporizer chamber is heated, it causes the fuel to evaporate. The fuel vapor formed in the vaporizer chamber can escape through a small nozzle into the intake area of a downstream combustion chamber together with air entering the vaporizer chamber through a corresponding air inlet.

When the glow plug is deactivated after the warm-up phase after a cold start, fuel is discharged through the vaporizer chamber only due to the internal combustion engine intake air flowing through the vaporizer chamber, with the small nozzle causing the fuel to be atomized.

With another conventional fuel injection device (described in German Patent Application No. 28 43 534), a heating element with vaporizer surfaces is provided upstream from the spray orifice in the fuel discharge area of an injection valve on the intake side, so that the fuel to be vaporized is sprayed onto the vaporizer surfaces of the heating element. A vaporizer area defined by the heating element is open on the outlet side. With this convential fuel injection device, a heating element with a honeycomb structure that is likewise open on the outlet side may also be provided to improve the heat transfer to the fuel.

If such a heating element in the spray area of the injection valve is not heated, it presents a relatively large obstacle for the sprayed stream of fuel and interferes with fuel processing to produce the mixture.

Therefore, with conventional fuel vaporizers arranged in the spray area of an injection valve, problems occur in processing the mixture, i.e., in processing the fuel to produce the fuel-air mixture when the fuel vaporizer is not heated electrically during continuous operation of the internal combustion engine, because the fuel vaporizer has a negative effect on the fuel stream produced by the injection valve and thus interferes with fuel delivery.

Another conventional fuel injection device described in German Patent No. 20 57 972 includes injection valves that are assigned to the individual combustion chambers of an internal combustion engine and receive fuel through pipelines from a fuel metering device. The fuel thus supplied enters a valve chamber of the respective injection valve that is closed by an outlet valve on the outlet end. The outlet valve includes a valve body that is preloaded in its closed position by a spring and is opened by the fuel pressure in the valve chamber when the force exerted by the fuel on the valve body exceeds the closing force of the spring.

Each injection valve has a heating body in its interior with which the fuel in the injection valve can be heated so that it evaporates even when the engine is cold, namely when it flows out through the outlet valve and expands in the outlet area of the injection valve.

SUMMARY OF THE INVENTION

One of the advantages of a fuel injection device according to the present invention is that a fuel vaporizer of the fuel injection device assures a very good fuel processing in all heating states, i.e., in heating operation for complete or partial vaporization and in the unheated state, because the fuel is always discharged at a preset pressure. The metering function of a standard injection valve is not affected by the fuel vaporizer because a constant difference between the fuel pressure in the injection valve and the pressure in the fuel vaporizer is guaranteed by the opening pressure of the outlet valve.

Therefore, the fuel injection device according to the present invention makes it possible to reduce both fuel consumption and pollution emissions, especially in a cold start and during the warm-up phase, because it eliminates any enrichment of the fuel-air mixture during start-up and acceleration.

Since the entire heating area in the fuel vaporizer is repeatedly rinsed with liquid fuel, deposits can be prevented reliably.

The danger of spontaneous ignition of the fuel in the heating area of the fuel vaporizer, i.e., in the area of the vaporizer, is practically eliminated, because only fuel and/or fuel vapor is present there.

If a gas channel is provided around the fuel vaporizer in the fuel injection device according to the present invention, heating of the fuel during continuous operation of the internal combustion engine can be provided, even when the electric heating is turned off, by supplying hot exhaust gas from the internal combustion engine to the gas channel. If air is supplied to the gas channel instead of exhaust gas, any fuel leaving the outlet valve in liquid form is finely atomized by the air stream.

In addition to using PTC heating elements, i.e., heating elements with a positive temperature coefficient, it is also possible to use NTC heating elements, i.e., heating elements with a negative temperature coefficient that can be controlled by an external control device. Use of NTC heating elements is advantageous with regard to manufacturing costs and tolerances and is economical in particular when external temperature control for the heating elements is necessary because of differences in fuel throughput.

Since the fuel vaporizer can readily be adapted to any injection valve, the fuel injection device according to the present invention can be used with any conventional injection valve that has a metering function.

DETAILED DESCRIPTION OF THE INVENTION

Figure 1:
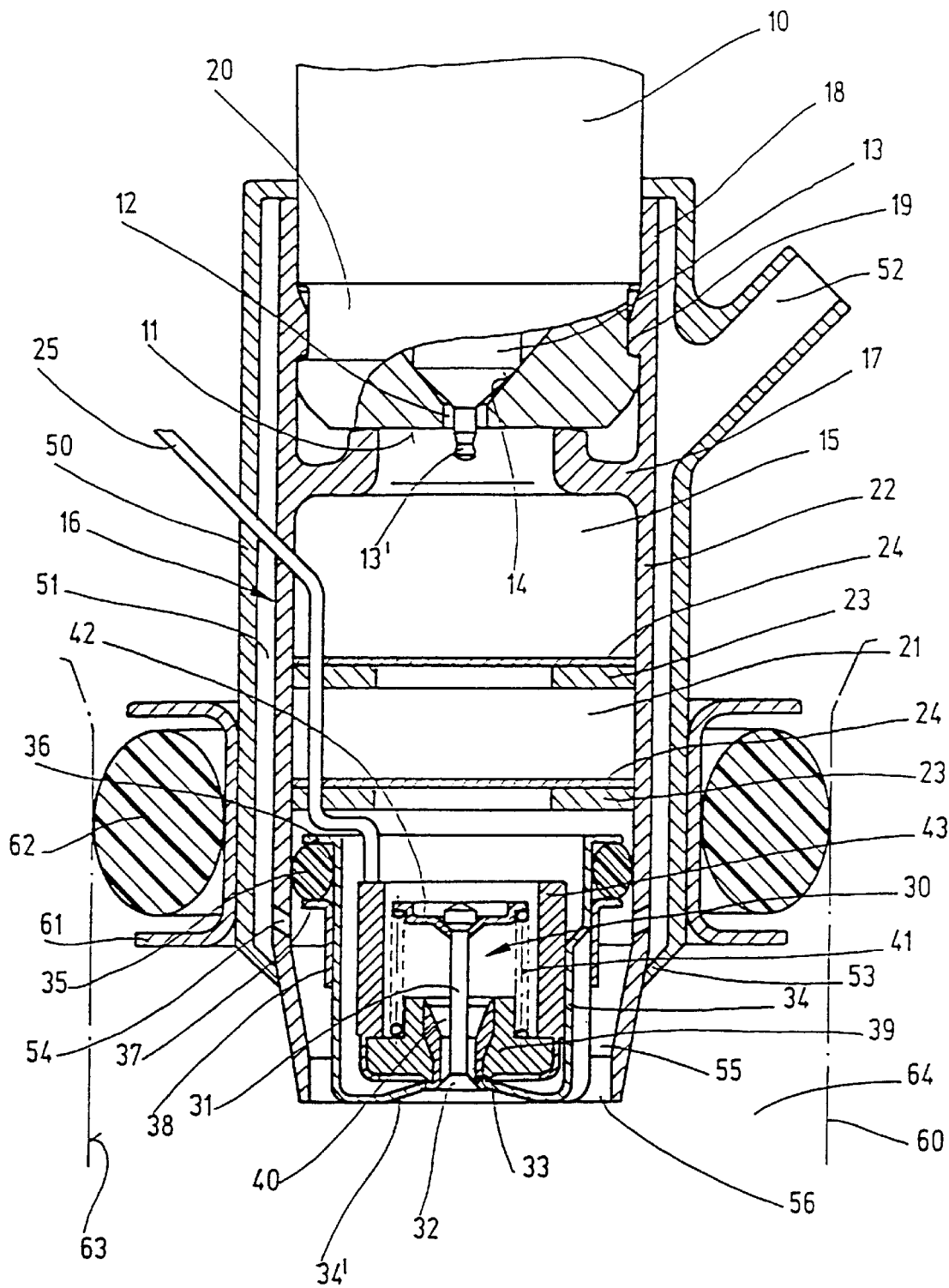
FIG. 1 shows a schematic section through a fuel injection device according to a first embodiment of the present invention.

Referring to FIG. 1, a fuel injection device for an internal combustion engine has a fuel-metering injection valve 10 that has a spray orifice 12 in its outlet face 11. A valve seat 14 that works together with a valve needle 13 is provided for the spray orifice 12.

In the illustrated embodiment, valve needle 13 has a spray pin 13' that extends through spray orifice 12 and is arranged in outlet orifice 12 when injection valve 10 is opened so that it shapes the fuel spray in a layer. The sprayed fuel layer essentially forms the envelope of a cone in spray area 15. However, the shape development of the fuel layer or of a stream of fuel may also be achieved by other methods including using one or more parts formed in an appropriate manner to achieve a desired shape. For example, it is possible to provide a perforated spray disk with one or more spray holes or to design the outlet orifice as an annular gap.

A fuel vaporizer 16 including a casing 17 with a sleeve-like mounting section 18 is tightly attached to the end of injection valve 10 on the intake side. An annular web 19 provided on the inside circumference of mounting section 18 engages with an annular groove 20 provided on the intake end of injection valve 10 and thus keeps fuel vaporizer 16 tightly on injection valve 10. Fuel vaporizer 16 may also be mounted differently. For example, it is also possible to provide an annular web on injection valve 10 to engage with a ring flange extending radially inward or a suitable annular groove provided on the inside of mounting section 18. The present invention also contemplates a tight pressure-fitting connection between fuel vaporizer 16 and injection valve 10.

Mounting section 18 of casing 17 is connected to receptacle sleeve 22 that extends away from injection valve 10 and peripherally surrounds the free spray area 15 of injection valve 10 and a vaporizer area 21 attached to it. Two heating elements 23 are arranged in the receptacle sleeve with some distance between them in the axial direction, are secured mechanically by metallic holding parts 24, and are electrically grounded. Holding parts 24 are for assisting the heat transfer from heating elements 23 to the sprayed fuel without interfering with the flow of fuel into vaporizer area 21.

Heating elements 23 are connected to a voltage source (not shown) through an electric line 25 that is electrically insulated. The electric line 25 is introduced into casing 17 with a gas-tight seal.

As illustrated in FIG. 1, heating elements 23 include ring disks. However, other geometric designs of heating elements 23 are also contemplated by the present invention.

Figure 2:
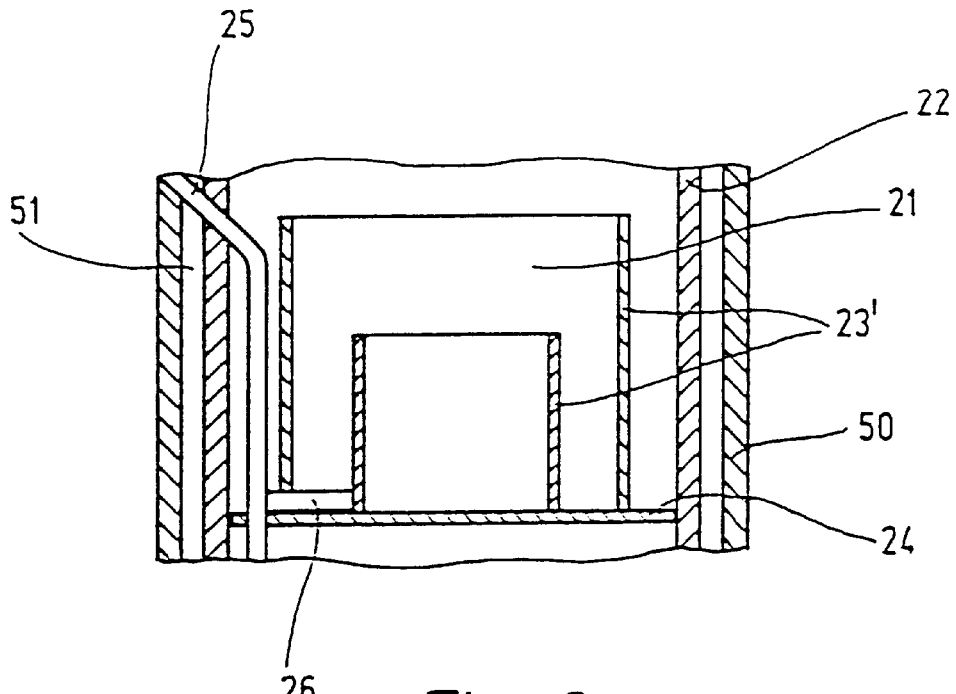
FIG. 2 shows a schematic section through a fuel vaporizer of the fuel injection device according to a second embodiment of the present invention.

FIG. 2 shows as an example of two sleeve-shaped heating elements 23' that are coaxial with one another and with receptacle sleeve 22. The heating elements 23' are secured by a common holding part 24. Holding part 24 is provided on the side of heating element 23' facing away from injection valve 10 and is designed (in a manner not shown in detail here) not to interfere with the discharge of fuel vapor out of vaporizer area 21. Inner heating element 23' is preferably designed to be shorter in the axial direction than the outer element 23. Heating elements 23' are connected electrically to line 25 through a branch line 26.

Figure 3:
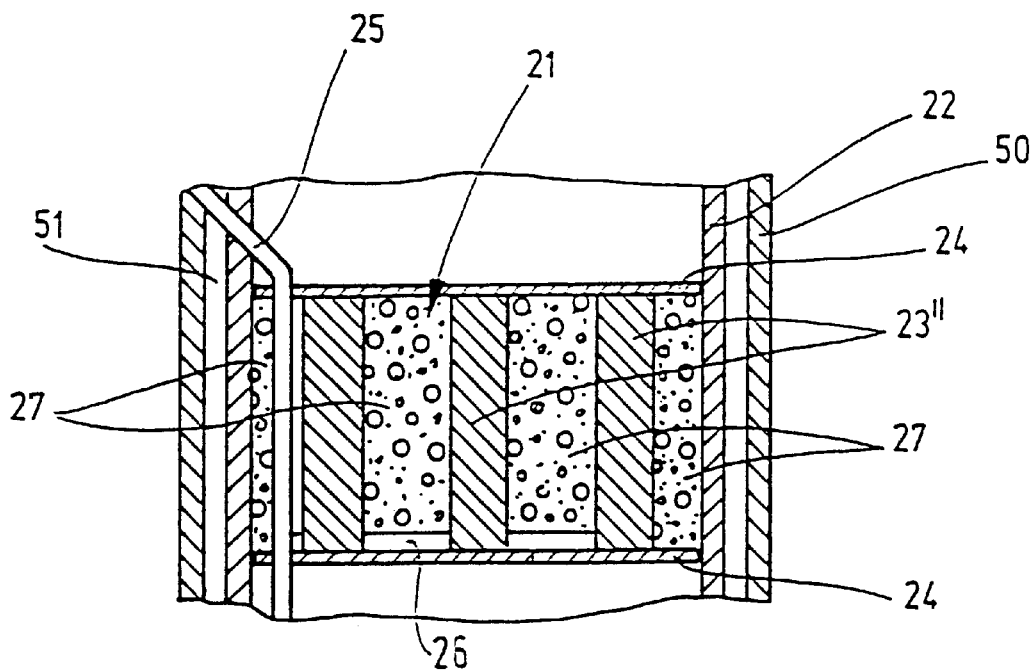
FIG. 3 shows a schematic section through the fuel vaporizer of the fuel injection device according to a third embodiment of the present invention.

FIG. 3 shows another embodiment of heating elements 23", wherein heating elements 23" are arranged concentrically with one another and with receptacle sleeve 22. The two heating elements 23" are secured at their axial ends by holding parts 24. Vaporizer area 21 between heating elements 23" is packed with a porous material 27, e.g., a porous ceramic or a fine metal wool, to further improve the transfer of heat to the fuel.

Regardless of geometric design, individual heating elements 23, 23' and 23" may be made of a PTC resistance material, i.e., a resistance material with a positive temperature coefficient. However, it is also possible to use an NTC resistance material, i.e., a resistance material with a negative temperature coefficient. In this case, an external temperature control must be provided. For this purpose, a temperature signal corresponding to the temperature of heating elements 23, 23' and 23" is sent to a temperature control device (not shown) that may be integrated into a controller for the internal combustion engine. To form the temperature signal, either the temperature-dependent internal resistance of heating elements 23, 23', and 23" may be used, or a temperature probe (not shown) may be provided on one of heating elements 23, 23', and 23".

It is especially advantageous to use heating elements 23, 23' and 23" made of an NTC resistance material when temperature control is necessary for heating elements 23, 23' and 23" due to, for example, differences in fuel throughput.

In the outflow direction of the fuel vapor, an outlet valve 30, preferably pressure regulated, which closes vaporizer area 21 at the outlet, is provided behind vaporizer area 21, i.e., on the side of heating elements 23, 23' and 23" facing away from injection valve 10.

Outlet valve 30, which includes a valve seat 33 and a needle-shaped valve body 31 with a closing head 32 on its end facing away from injection valve 10, is arranged in holding sleeve 34. Holding sleeve 34 has a seal ring 35 on its outside that is in contact with the inside of receptacle sleeve 22. The seal ring 35 is inserted between a flange 36 projecting radially outward from holding sleeve 34 and a flange 37 that also projects outward from a supporting sleeve 38 arranged on holding sleeve 34. On its outlet end, holding sleeve 34 has a holding flange 34' that extends radially inward and has a valve seat body 39 carrying valve seat 33 attached to it.

Valve body 31 that extends through a through opening 40, surrounded by valve seat 33 in valve seat body 39 is preloaded by a closing spring 41, preferably designed as a compression spring. The closing spring 41 is mounted between valve seat body 39 and a supporting disk 42 arranged on the end of valve body 31 facing away from closing head 32. The valve body 31 is preloaded to keep injection valve 10 in its closed position where closing head 32 provided for the outside area of outlet valve 30 is in contact with valve seat 33.

The valve closing force produced by closing spring 41 is preset so that outlet valve 30 opens at an internal pressure of 2000 hPa to 4000 hPa.

Instead of the mechanically produced closing force, the present invention also contemplates a magnetically produced closing force supplied by, for example, a permanent magnet.

Another sleeve-shaped heating element 43 that is provided for outlet valve 30 is mounted on valve seat body 39 and surrounds valve body 31 as well as closing spring 41. Heating element 43 is connected both to electric line 25 and to holding sleeve 34 at an outside circumferential section.

In one embodiment, a jacket sleeve 50 may optionally be provided around casing 17, forming together with casing 17 a cylindrical annular gas channel 51 that can receive at its inlet either air or preferably exhaust gas recycled from the internal combustion engine through a connection 52. At the outlet end, jacket sleeve 50 is bent inward like a flange and is in airtight contact with casing 17 at bent section 53. Casing 17 has several outlet orifices 54 behind the contact area of ring gasket 35 on the end facing away from injection valve 10 as seen in the direction of fuel injection; these orifices may be arranged at equal intervals around the periphery, for example.

To guide a stream of air or exhaust along the outside of holding sleeve 34, the end of casing 17 or receptacle sleeve 22 facing away from injection valve 10 extends as far as the front end of holding sleeve 34 for outlet valve 30 and thus together with holding sleeve 34 it forms a cylindrical annular outlet channel 55 surrounding the holding sleeve. The front section of receptacle sleeve 22 which serves as a gas baffle wall for the stream of air or exhaust gas and surrounds outlet channel 55 on the outside may have a slight inward conical taper.

Gas channel 51 surrounding fuel vaporizer 16 is designed together with outlet orifices 54 so that intake air or recycled exhaust from the internal combustion engine escapes at a high velocity from an annular gap-shaped gas outlet orifice 56 formed between holding sleeve 34 and receptacle sleeve 22.

For installation of the fuel injection device described herein the wall of an intake tube 60, shown only with dotted lines in FIG. 1, a holding ring 61 with a U-shaped cross section that is open to the outside radially is provided on jacket sleeve 50 into which a seal ring 62 is inserted; when installed, the seal ring 62 is in tight contact with inside wall 63 of a corresponding orifice 64 in intake tube 60. Holding ring 61 together with ring gasket 62 provide thermal insulation between fuel vaporizer 16 and intake tube 60 of the internal combustion engine. If jacket sleeve 50 is not provided to form gas channel 51 surrounding fuel vaporizer 16, holding ring 61 is placed directly on casing 17.

In operation of the internal combustion engine, heating elements 23, 23' and 23" in the vaporizer area and heating element 43 provided for outlet valve 30 are electrically heated during the warm-up phase after starting the engine. Fuel injected by fuel metering injection valve 10 into spray area 15 in fuel vaporizer 16 goes from there to vaporizer area 21, where it strikes heating elements 23, 23', 23", holding parts 24 and, with a third embodiment shown in FIG. 3, also the porous material 27 in vaporizer area 21 and is heated and at least partially vaporized therein. Depending on the shape of the injected fuel stream, some of the liquid fuel may also strike the inside surface of receptacle sleeve 22, where it is also evaporated if receptacle sleeve 22 is hot enough.

Due to the vaporization of fuel, the pressure inside fuel vaporizer 16 increases until it reaches the preset opening pressure, then outlet valve 30 opens and fuel is discharged. The hot discharged fuel, partially liquid and partially vapor, is additionally heated by heating element 43 and by outlet valve 30 which is also heated by the heating element 43.

As the hot mixture of liquid and vaporized fuel is discharged into intake tube 60 under a defined pressure, its expansion causes additional vaporization of liquid fuel. Heating elements 23, 23' and 23" are designed and/or are controlled by the temperature regulator to regulate the vapor/liquid ratio of fuel in the intake tube to the required level to supply an optimum fuel/air mixture for operation of the internal combustion engine.

An important advantage of fuel vaporizer 16 according to the present invention is that the injection of liquid fuel and the discharge of the hot mixture of liquid and vaporized fuel can overlap in time without impairing the fuel metering function of injection valve 10.

Even when heating elements 23, 23' and 23" are turned off, the pressure in fuel vaporizer 16 increases up to the opening pressure due to fuel at a higher pressure being injected by injection valve 10. If the fuel pressure in the fuel vaporizer reaches the opening pressure when the heating is turned off, the essentially liquid fuel is discharged under this defined preset pressure, typically between 2000 hPa and 4000 hPa, and is thus atomized, so that neither the fuel delivery nor the fuel processing is impaired by fuel vaporizer 16 with vaporizer area 21 closed by outlet valve 30.

If, during continuous operation of the internal combustion engine, hot exhaust from the internal combustion engine is supplied to the optional gas channel 51, then the fuel vaporizer 16 is heated, and fuel is vaporized without any additional electric heating. Alternatively, atomization of fuel is supported by introducing air into gas channel 51.

The fuel metering function of injection valve 10, i.e., the amount of fuel metered per unit of injection time, is maintained unchanged due to the utilization of the pressure gradations between the pressure in injection valve 10 and the outlet pressure of fuel vaporizer 16 and between the outlet pressure and the pressure in intake tube 60.

What is claimed is:

1. A fuel injection device for an internal combustion engine, comprising:

an outlet valve including a first at least one heating element;

a metering injection valve having an outlet spray orifice; and a fuel vaporizer positioned substantially downstream from the spray orifice of the metering injection valve on an intake side, the fuel vaporizer including a vaporizer area having a second at least one heating element, wherein the the vaporizer area is closed at an outlet end of the vaporizer area by the outlet valve.

2. The fuel injection device according to claim 1, wherein the outlet valve includes a valve body, the outlet valve being driven to a closed position by a closing force, the outlet valve being driven to an open position by a pressure in the fuel vaporizer when a pressure-induced force acting on the valve body exceeds the closing force.

3. The fuel injection device according to claim 2, wherein the closing force driving the outlet valve to a closed position is adjustable.

4. The fuel injection device according to claim 1, wherein the first at least one heating element is connected to a valve seat, the first at least one heating element cylindrically and annularly surrounding the valve body and a closing-force generating element.

5. The fuel injection device according to claim 4, wherein the closing-force generating element includes a closing spring.

6. The fuel injection device according to claim 1, wherein the second at least one heating element is composed of a resistance material having a positive temperature coefficient.

7. The fuel injection device according to claim 6, further comprising:

a temperature regulator associated with the second at least one heating element, the temperature regulator regulating a temperature by controlling a heating current supplied to the second at least one heating element, wherein the temperature regulator generates a temperature signal associated with the temperature of the second at least one heating element.

8. The fuel injection device according to claim 1, wherein the second at least one heating element is composed of a resistance material having a negative temperature coefficient.

9. The fuel injection device according to claim 8, further comprising:

a temperature regulator associated with the second at least one heating element, the temperature regulator regulating a temperature by controlling a heating current supplied to the second at least one heating element, wherein the temperature regulator generates a temperature signal associated with the temperature of the second at least one heating element.

10. A fuel injection device for an internal combustion engine, comprising:

an outlet valve;

a metering injection valve having an outlet spray orifice;

a fuel vaporizer positioned substantially downstream from the spray orifice of the metering injection valve on an intake side, the fuel vaporizer including a vaporizer area having at least one heating element, wherein the vaporizer area is closed at an outlet end of the vaporizer area by the outlet valve; and a gas channel surrounding the fuel vaporizer, the gas channel receiving a gas at an inlet end of the fuel vaporizer and extending into a cylindrical outlet channel, the cylindrical outlet channel surrounding a holding sleeve of the outlet valve and including a gas outlet orifice that forms an annular gap, the gas outlet orifice positioned substantially parallel to a through orifice outlet of the outlet valve.

11. The fuel injection device according to claim 10, wherein the gas an exhaust gas recycled from the internal combustion engine.

12. A fuel injection device for an internal combustion engine, comprising:

an outlet valve;

a metering injection valve having an outlet spray orifice; and a fuel vaporizer positioned substantially downstream from the spray orifice of the metering injection valve on an intake side, the fuel vaporizer including a vaporizer area including at least two heating elements, the at least two heating elements having an area therebetween, the area being filled with a porous material that thermally contacts the at least two heating elements.

13. The fuel injection device according to claim 12, wherein the porous material includes at least one of a porous ceramic material and a fine metal wool material.

* * * * *